UNITED STATES PATENT OFFICE.

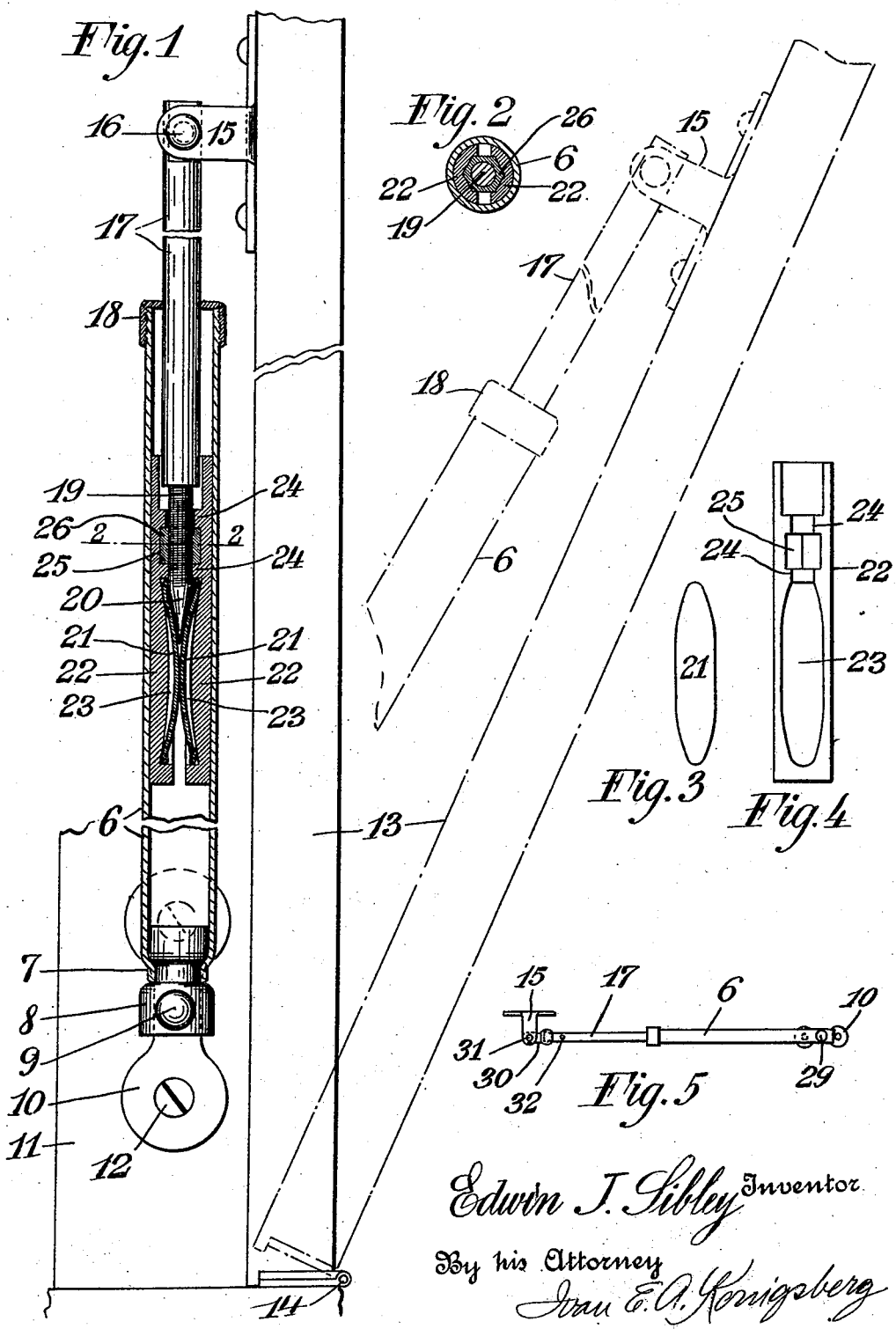

EDWIN J. SIBLEY, OF WOODHAVEN, NEW YORK.

FRICTION CASEMENT ADJUSTER.

1,412,199.  Specification of Letters Patent.  Patented Apr. 11, 1922.

Application filed March 29, 1921. Serial No. 456,514.

*To all whom it may concern:*

Be it known that I, EDWIN J. SIBLEY, a citizen of the Dominion of Canada, and resident of Woodhaven, in the county of Queens and State of New York, have invented certain new and useful Improvements in Friction Casement Adjusters, of which the following is a specification.

This invention relates to improvements in friction casement adjusters for use on casement windows, transoms, doors, trapdoors, shelves or any other hinged device the free swing of which it is desired to control.

More particularly the invention relates to an improved casement adjuster having means whereby the degree of tractional resistance in the adjuster may be regulated or adjusted to a fine degree after the device has been permanently placed in position.

The main object of the invention is to provide a means of quick adjustment for regulating the friction or drag in the device by simply grasping the barrel of the adjuster in the hand and rotate it either to the left or to the right until the tractional resistance has been regulated to suit the peculiar local conditions. Other objects of the invention are to provide a generally improved friction casement adjuster.

Accordingly my invention is embodied in a friction casement adjuster as hereinafter described and as illustrated in the accompanying drawing in which—

Fig. 1 is a longitudinal sectional view of an adjuster embodying my invention with parts broken away.

Fig. 2 is a transverse sectional view on line 2—2 of Figure 1.

Fig. 3 is a detail view of one of the clutch springs.

Fig. 4 is a view of one of the clutch members and

Fig. 5 is an outside view of an adjuster showing a modification.

The casement adjuster comprises a tube or barrel 6 which is rotatably mounted as at 7 on a stud or arm 8 which latter in turn is pivoted at 9 on a bracket 10. The reference numeral 11 denotes the window sill, frame or other fixed member to which the bracket 10 is secured by screws 12.

The numeral 13 denotes the window sash or frame or other movable member the free swing of which it is desired to control. It is pivoted at 14 to the member 11. To the movable member 13 is secured a bracket 15 to which is pivoted at 16 a plunger 17. A cap 18 on the tube provides a guiding means for the plunger and serves to close the end of the tube 6 and thereby enhance the appearance of the device.

The tube 6 and plunger 17 are operatively connected by a suitable clutch or similar means providing friction between the said two members and also affording means for regulating the friction.

In this instance the said means may take the following form. Within the tube the plunger is provided with a reduced portion or screw 19 having a pointed head 20 adapted to operate between the springs 21, 21 in the clutch members 22, 22.

These latter are symmetrical and of suitable friction material, metal, composition or otherwise and each of the members is formed with a recess 23 for the reception of the spring 21, reduced bearing portions 24, 24 for the screw 19 and a nut receiving recess 25. 26 is a nut in threaded engagement with the screw 19 and adapted to fit nicely within the nut receiving recesses 25 of the clutch members 22 which are substantially semicircular in cross section as shown in Figure 2.

In assembling the springs are laid in the recesses 23, the nut placed in the recesses 25 and thus assembled the clutch is placed inside the tube 6 in which the clutch slides with a nice fit. Thereafter the plunger is screwed into the nut until the pointed end 20 comes into engagement with the springs and separates them thus putting tension on the clutch members in forcing them outward against the wall of the tube as will be understood.

The cap has of course been placed on the plunger and is thereafter screwed fast on the tube. The adjuster is then placed in position and secured as shown and as described above.

It will be seen then, that in order to adjust the friction all that is necessary is to rotate the tube 6 with one hand without detaching any of the parts of the adjuster and whereby the plunger will be screwed into or out of the nut to force the springs apart to increase the tension and friction, or to permit the springs to relax and thus decrease the tension or friction.

Preferably the movable member 13 will be opened as shown in dotted lines and then the friction adjusted as it is then an easy matter to determine the degree of adjustment.

The construction herein disclosed possesses many advantages. Adjustment is obtained to a nice degree without the use of tools or similar means. The parts are few and simply laid together making assembling and disassembling a matter of a few moments.

The friction may be adjusted to a maximum degree of resistance or pressure expected or calculated for the member 13, yet if such maximum is exceeded unexpectedly, the plunger and clutch mechanism may slide within the tube thus preventing accidents or breakage.

In Figure 5 is shown a modification in which the tube 6 is pivoted directly and therefore non-rotatably at 29 on the bracket 10 while the plunger 17 is rotatably mounted in an arm 30 pivoted at 31 to the bracket 15. In this instance the plunger may also be rotated by hand only to adjust the friction, or a hole 32 may be provided in which a pin (not shown) may be inserted to rotate the plunger.

While I have disclosed the preferred form of my invention, changes may of course be made within the scope of the appended claims.

I claim:—

1. The combination of a tube, a plunger adapted to slide therein, friction means interposed between said plunger and tube, means for positioning said plunger and tube in relatively fixed predetermined positions and means for adjusting the said friction means by rotation of the said tube while the latter and the plunger remain positioned as aforesaid.

2. The combination of a tube, a plunger adapted to slide within the tube, means for positioning the plunger and tube in relatively fixed predetermined positions, friction means between said plunger and tube within the latter and means for adjusting said friction means by rotating the tube without disturbing the relatively fixed predetermined relationship between the plunger and tube as aforesaid.

3. The combination of a tube, a plunger adapted to slide therein, means for securing said plunger and tube in relatively fixed predetermined positions, friction means between said plunger and tube within the latter comprising clutch members, means on said plunger for forcing said clutch members into frictional engagement with the said tube and means for operating the said last named means by rotating said tube after the latter and the said plunger have been secured as aforesaid and without removing either of said elements from the said fixed positions.

4. The combination of a tube, a plunger adapted to slide therein, means for securing said plunger and tube in relatively fixed predetermined positions, friction means interposed between said plunger and tube within the latter, said friction means comprising a pair of oppositely disposed clutch members, springs seated in the latter and between the same, a nut mounted between said clutch members, a screw carried by said plunger in threaded engagement with the said nut, said screw having a pointed head adapted to engage the said springs to regulate the tension thereof and means operable by rotation of said tube for actuating the said screw while said tube and plunger remain in their said respective positions.

Signed at Jamaica in the county of Queens and State of New York.

EDWIN J. SIBLEY.